United States Patent
Park et al.

(10) Patent No.: US 11,476,793 B2
(45) Date of Patent: Oct. 18, 2022

(54) MOTOR DRIVE SYSTEM WITH CORRECTION FUNCTION OF TEMPERATURE DEVIATION OF IGBT MODULE

(71) Applicant: HYUNDAI MOBIS CO., LTD., SEOUL (KR)

(72) Inventors: Hyung Min Park, Seoul (KR); Dong On Jang, Uiwang-si (KR); Na Yeon Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 57 days.

(21) Appl. No.: 17/106,607

(22) Filed: Nov. 30, 2020

(65) Prior Publication Data

US 2021/0167717 A1    Jun. 3, 2021

(30) Foreign Application Priority Data

Nov. 28, 2019    (KR) .......................... 10-2019-0155609

(51) Int. Cl.
*H02M 7/5387* (2007.01)
*H02P 29/68* (2016.01)
*H02K 11/25* (2016.01)
*H02K 11/33* (2016.01)

(52) U.S. Cl.
CPC .............. *H02P 29/68* (2016.02); *H02K 11/25* (2016.01); *H02K 11/33* (2016.01)

(58) Field of Classification Search
CPC ......... H02P 29/68; H02K 11/25; H02K 11/33; H02M 7/5387
See application file for complete search history.

(56) References Cited

U.S. PATENT DOCUMENTS

| 2017/0257027 | A1* | 9/2017 | Yamamoto | ............ H02M 3/158 |
| 2017/0288595 | A1* | 10/2017 | Shinomoto | ......... H02M 7/5387 |
| 2018/0287495 | A1 | 10/2018 | Isham et al. | |

FOREIGN PATENT DOCUMENTS

| JP |  | 6080894 B2 | 10/2018 |
| KR | 10-2013-0055892 A | | 5/2013 |
| KR |  | 101405223 B1 | 7/2014 |
| KR | 10-2015-0025919 A | | 3/2015 |
| KR | 10-2018-0060012 A | | 6/2018 |

(Continued)

OTHER PUBLICATIONS

Notice of Allowance issued in corresponding Korean Patent Application No. 10-2019-0155609 dated Oct. 27, 2021, with English translation.

(Continued)

*Primary Examiner* — Cortez M Cook
(74) *Attorney, Agent, or Firm* — Morgan, Lewis & Bockius LLP

(57) ABSTRACT

A motor drive system with a correction function of a temperature deviation of an IGBT module is provided. The system may include: a gate board configured to detect a plurality of sensing temperature information by sensing the IGBT module, acquire a difference value between maximum temperature information among the plurality of sensing temperature information and at least one sensing temperature information, and correct and output the at least one sensing temperature information by using the acquired difference value.

9 Claims, 15 Drawing Sheets

(56) References Cited

FOREIGN PATENT DOCUMENTS

| KR | 101887906 B1 | 8/2018 |
| KR | 20180123311 A | 11/2018 |
| KR | 10-2019-0089659 A | 7/2019 |

OTHER PUBLICATIONS

Office Action issued in corresponding Korean Patent Application No. 10-2019-0155609 dated Jul. 12, 2021.

* cited by examiner

MOTOR DRIVE SYSTEM WITH CORRECTION FUNCTION OF TEMPERATURE DEVIATION OF IGBT MODULE

CROSS-REFERENCE TO RELATED APPLICATION

This application claims priority to and the benefit of Korean Patent Application No. 10-2019-0155609 filed on Nov. 28, 2019, the entire contents of which are incorporated herein by reference.

TECHNICAL FIELD

The present disclosure relates to a motor drive system, and as an example, to a motor drive system with a correction function of a temperature deviation of an IGBT module.

BACKGROUND

Isolated-gate bipolar transistor (IGBT) devices are used a lot as a switching circuit of a drive unit that uses a lot of high-voltage signals such as motor driving or high-voltage conversion of an electric vehicle and a hybrid system as eco-friendly vehicles such as electric vehicles, hybrid vehicles, and fuel cell vehicles grow.

Since the IGBT device is a semiconductor module applied to a vehicle, there are a lot of safety requirements. In particular, there is a possibility that the IGBT device will operate abnormally when a temperature increases to an allowed max junction temperature or higher, and as a result, damage such as human accidents may occur, and as a result, sensing technology for the temperature of the IGBT device is very important.

SUMMARY

The present disclosure provides a motor drive system with a correction function of a temperature deviation of an IGBT module correcting the temperature deviation for each switching element of the IGBT module without adding a separate control element.

An exemplary embodiment of the present disclosure provides a motor drive system with a correction function of a temperature deviation of an IGBT module, which includes: a gate board detecting a plurality of sensing temperature information by sensing the IGBT module, acquiring a difference value between maximum temperature information among the plurality of sensing temperature information and at least one sensing temperature information, and correcting and outputting the at least one sensing temperature information by using the acquired difference value.

The motor drive system may further include an ECU calculating final temperature information of the IGBT module by using the corrected sensing temperature information and reference temperature information of the IGBT module.

The reference temperature information may be acquired from an NTC of the IGBT module.

The IGBT module may include a plurality of IGBT elements for motor driving, the gate board may include a plurality of integrated circuit units connected to the plurality of IGBT elements, respectively, and the plurality of integrated circuit units may detect the sensing temperature information from the IGBT elements, respectively.

Each of the plurality of integrated circuit units may include a temperature sensing unit detecting the sensing temperature information from a sensing diode located around each of the IGBT elements, a signal processing unit converting a form of the sensing temperature information sensed by the temperature sensing unit and outputting the form as a duty pulse, and a deviation acquiring unit calculating a difference value between the maximum temperature information and the sensing temperature information corresponding to the duty pulse output from the signal processing unit.

The motor drive system may further include an average calculating unit calculating an average of the difference value calculated by the deviation acquiring unit.

The signal processing unit may output the corrected duty pulse by adding the difference value to the duty pulse corresponding to the sensing temperature information.

The corrected duty pulses output from the respective integrated circuit units may have the same duty ratio.

The gate board may correct an OC detection level of the IGBT module by using the reference temperature information and the maximum temperature information.

The gate board may include an OC sensing unit that subtracts compensation voltage depending on the reference temperature information and the maximum temperature information from reference voltage and compares a subtraction result and the OC voltage depending on current of the IGBT module.

According to an exemplary embodiment of the present disclosure, by a motor drive system with a correction function of a temperature deviation of an IGBT module, the temperature deviation for each switching element of the IGBT module is corrected without a separate control element such as a micom to acquire an economical effect through shortening of a controller manufacturing time and deletion of a related circuit.

A characteristic deviation which is changed according to product aging is optimized whenever a vehicle is started, which greatly contributes even to enhancement of product performance.

The foregoing summary is illustrative only and is not intended to be in any way limiting. In addition to the illustrative aspects, embodiments, and features described above, further aspects, embodiments, and features will become apparent by reference to the drawings and the following detailed description.

DRAWINGS

Figure 1:
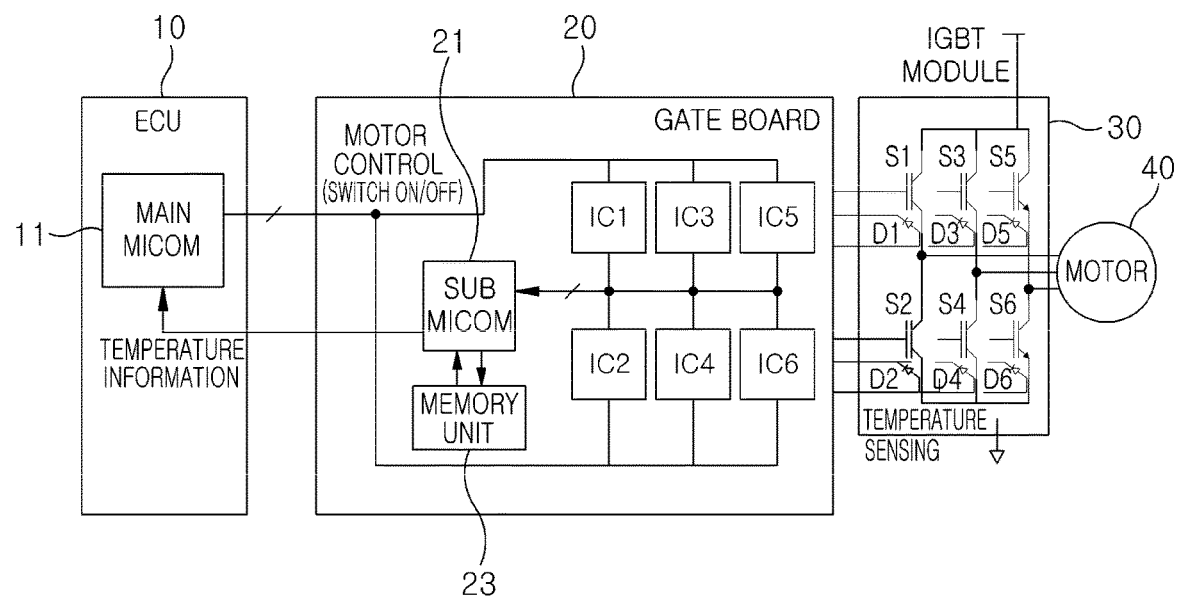
FIG. 1 is a configuration block diagram of a motor drive system in the related art.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, a preferred embodiment of the present disclosure will be described in detail with reference to the accompanying drawings. First, when reference numerals refer to components of each drawing, it is to be noted that although the same components are illustrated in different drawings, the same components are denoted by the same reference numerals as possible. Further, hereinafter, the preferred embodiment of the present disclosure will be described, but the technical spirit of the present disclosure is not limited thereto or restricted thereby and the embodiments can be modified and variously executed by those skilled in the art.

Referring to FIG. 1, a motor driving system with a temperature sensing function in the related art may be confirmed.

The motor drive system in the related art includes an ECU 10 including a main micom (uC) 11, a gate board 20 including a plurality of integrated circuits IC1, IC2, IC3, IC4, IC5, and IC6, an IGBT module 30 including a plurality of switching elements S1, S2, S3, S4, S5, and S6 and temperature sensing diodes D1, D2, D3, D4, D5, and D6, and a motor 40 constituted by a 3-phase coil.

The main micom (uC) 11 computes current information of the motor 40 and temperature information of the IGBT module 30 to generate a control signal for controlling motor driving.

The plurality of integrated circuits IC1, IC2, IC3, IC4, IC5, and IC6 on/off-controls a corresponding switching element among the plurality of switching elements S1, S2, S3, S4, S5, and S6 according to the control signal of the main micom (uC).

The plurality of integrated circuits IC1, IC2, IC3, IC4, IC5, and IC6 detects the temperature information by monitoring a corresponding temperature sensing diode among the plurality of temperature sensing diodes D1, D2, D3, D4, D5, and D6.

The plurality of switching elements S1, S2, S3, S4, S5, and S6 may perform the switching operation according to the control of the plurality of integrated circuits IC1, IC2, IC3, IC4, IC5, and IC6. Therefore, the motor 40 may be driven.

Meanwhile, the gate board 20 may monitor a state of the switching element of the IGBT module 30 and include a sub micom (Sub uC) 21 transferring a monitoring value to a control board and a memory unit 23.

The sub micom 21 receives the temperature information of the plurality of temperature sensing diodes D1, D2, D3, D4, D5, and D6 from the plurality of integrated circuits IC1, IC2, IC3, IC4, IC5, and IC6. The sub micom 21 calculates a deviation between a plurality of temperature information. The sub micom 21 corrects the temperature information of the IGBT module 30 by using a calculated temperature deviation. The sub micom 21 transfers maximum temperature information of the IGBT module 30 provided through correction to the main micom 11.

The memory unit 23 stores the calculated temperature deviation and the maximum temperature information of the IGBT module 30.

As such, in the related art, there is a problem in that in order to correct the temperature deviation for each switching element during a controller production process, related circuits such as the sub micom 21 that performs a temperature deviation correction task one by one and the memory 23 are added, and as a result, circuit complexity and cost increase.

Since there is no step of considering a characteristic change of the IGBT module 30 depending on aging of a controller product, temperature deviation correction depending on occurrence of an additional temperature deviation is not made.

Figure 2:
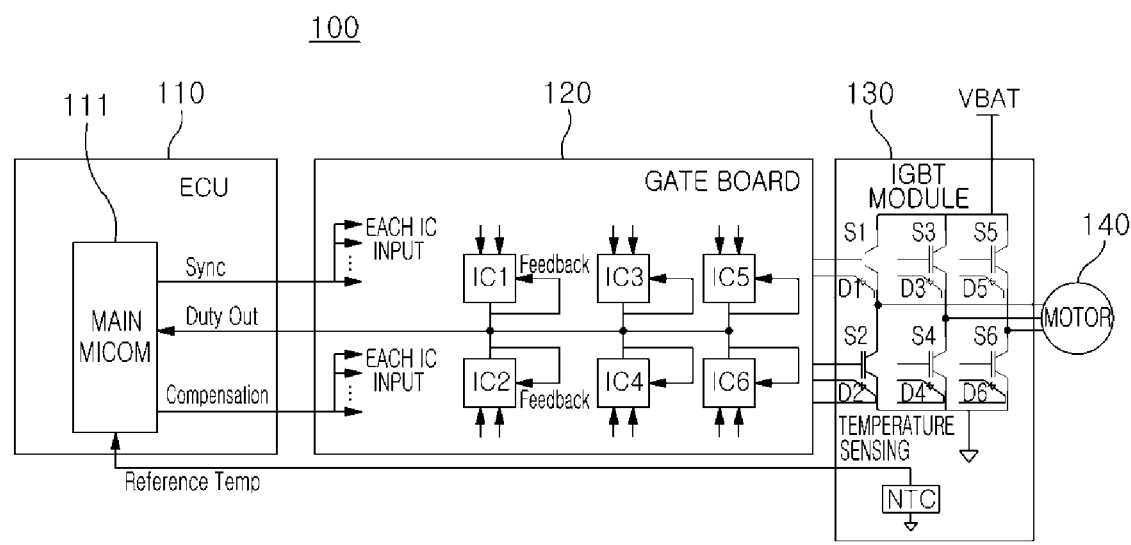
FIG. 2 is a configuration block diagram of a motor drive system with a correction function of a temperature deviation of an IGBT module in one form of the present disclosure.

FIG. 2 is a configuration block diagram of a motor drive system with a correction function of a temperature deviation of an IGBT module in some forms of the present disclosure.

Referring to FIG. 2, a motor drive system 100 with a correction function of a temperature deviation of an IGBT module in some forms of the present disclosure includes an ECU 110, a gate board 120, an IGBT module 130, and a motor 140.

The ECU 110 includes a main micom 111 generating a control signal for controlling motor driving. The main micom 111 transmits the control signal to the gate board 120 to control the motor driving through the gate board 120. The main micom 111 may receive various information required for generating the control signal, from the gate board 120 and the IGBT module 130.

The main micom 111 may receive a duty pulse (Duty out) signal related to sensing temperature information of the IGBT module 130 from the gate board 120. Further, the main micom 111 may receive reference temperature information (Reference Temp) from a negative temperature coefficient (NTC) of the IGBT module 130.

The main micom 111 stores the received duty pulse (Duty out) and reference temperature information in a separate register. The main micom 111 may calculate a difference between the duty pulse and the reference temperature information. The main micom 111 may calculate final temperature information of the IGBT module 130 according to a calculated temperature difference. The main micom 111 may determine whether the IGBT module 130 is usable by using the final temperature information.

The main micom 111 may transmit a synchronization signal Sync for synchronization between a plurality of duty pulses to the gate board 120 when generating the duty pulse in each integrated circuit unit of the gate board 120.

The gate board 120 may include a plurality of integrated circuit units controlling turn-on or turn-off of the IGBT device of the IGBT module according to the control signal transferred from the ECU 110. The plurality of integrated circuit units may include a first integrated circuit unit IC1, a second integrated circuit unit IC2, a third integrated circuit unit IC3, a fourth integrated circuit unit IC4, a fifth integrated circuit unit IC5, and a sixth integrated circuit unit IC6.

The plurality of integrated circuit units may control turn-on or turn-off of corresponding IGBT elements of the IGBT module 130, respectively. The plurality of integrated circuit units may detect the sensing temperature information from the corresponding IGBT elements of the IGBT module 130, respectively. Each of the plurality of integrated circuit units may transfer sensing temperature information having the same temperature information to the main micom 111 in the form of the duty pulse through appropriate correction.

The IGBT module 130 may include a plurality of IGBT elements which turns on or turns off according to driving voltage of the gate board 120. The plurality of IGBT elements may include a first IGBT element S1, a second IGBT element S2, a third IGBT element S3, a fourth IGBT element S4, a fifth IGBT element S5, and a sixth IGBT element S6.

A gate terminal of each of the plurality of IGBT elements may be connected to a corresponding integrated circuit unit of the gate board 120. Each of the plurality of IGBT elements may be turn-on or turn-off controlled by the corresponding integrated circuit unit of the gate board 120.

The first IGBT element S1 and the second IGBT element S2 may be connected to a first phase of the motor 140. The third IGBT element S3 and the fourth IGBT element S4 may be connected to a second phase of the motor 140. The fifth IGBT element S5 and the sixth IGBT element S6 may be connected to a third phase of the motor 140. Each of the plurality of IGBT elements turn-on or turn-off operates and applies battery voltage VBAT to rotate the motor 140.

The IGBT module 130 may include a plurality of temperature sensing diodes measuring surrounding temperature information of each of the plurality of IGBT elements. The plurality of temperature sensing diodes may include a first temperature sensing diode D1, a second temperature sensing diode D2, a third temperature sensing diode D3, a fourth temperature sensing diode D4, a fifth temperature sensing diode D5, and a sixth temperature sensing diode D6.

The first temperature sensing diode D1 may be located around the first IGBT element S1. The first temperature sensing diode D1 may be connected to the first integrated circuit unit IC1.

The second temperature sensing diode D2 may be located around the second IGBT element S2. The second temperature sensing diode D2 may be connected to the second integrated circuit unit IC2.

The third temperature sensing diode D3 may be located around the third IGBT element S3. The third temperature sensing diode D3 may be connected to the third integrated circuit unit IC3.

The fourth temperature sensing diode D4 may be located around the fourth IGBT element S4. The fourth temperature sensing diode D4 may be connected to the fourth integrated circuit unit IC4.

The fifth temperature sensing diode D5 may be located around the fifth IGBT element S5. The fifth temperature sensing diode D5 may be connected to the fifth integrated circuit unit IC5.

The sixth temperature sensing diode D6 may be located around the sixth IGBT element S6. The sixth temperature sensing diode D6 may be connected to the sixth integrated circuit unit IC6.

In each of the plurality of temperature sensing diodes, the temperature information may be sensed by the corresponding integrated circuit unit of the gate board 120. Since the temperature information of each of the plurality of temperature sensing diodes has the deviation, each integrated circuit unit may correct the deviation of the temperature information and transfer the corrected deviation to the main micom 111.

The motor 140 may be a motor for vehicle driving. The motor 140 may rotate through current applied to a 3-phase coil.

Figure 3:
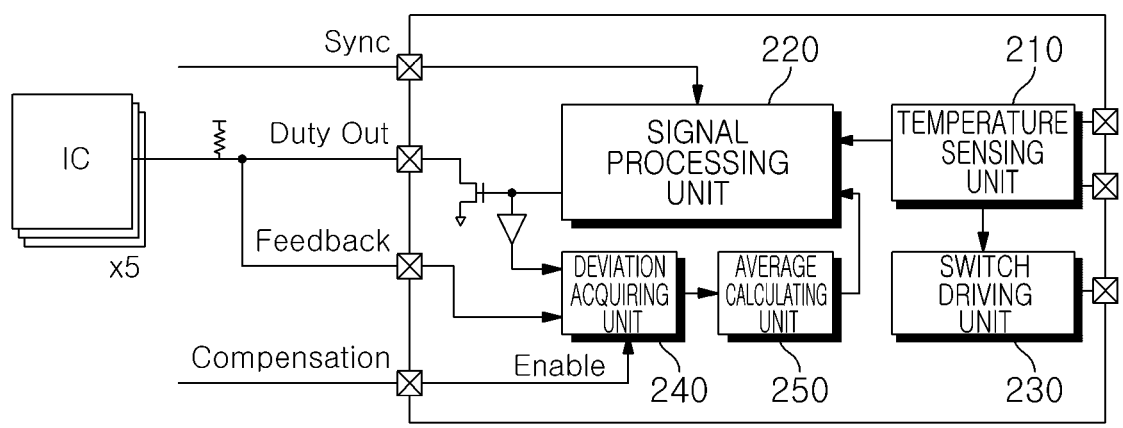
FIG. 3 is a block diagram illustrating a configuration of an integrated circuit unit of FIG. 2.

FIG. 3 is a block diagram illustrating a configuration of an integrated circuit unit of FIG. 2.

Referring to FIG. 3, a detailed configuration of the integrated circuit unit may be confirmed. The integrated circuit unit of FIG. 3 corresponds to any one of the first to sixth integrated circuit units IC1, IC2, IC3, IC4, IC5, and IC6. The first to sixth integrated circuit units IC1, IC2, IC3, IC4, IC5, and IC6 may be connected to each other through a duty out terminal Duty Out.

The integrated circuit unit may include a temperature sensing unit 210, a signal processing unit 220, a switch driving unit 230, a deviation acquiring unit 240, and an average calculating unit 250.

The temperature sensing unit 210 may sense the temperature information of the corresponding IGBT element. The temperature sensing unit 210 may sense voltage of the temperature sensing diode around the corresponding IGBT element. That is, the temperature sensing unit 210 may estimate the temperature information of the corresponding IGBT element through the voltage of the temperature sensing diode.

The signal processing unit 220 may receive the synchronization signal Sync from the main micom 111. The signal processing unit 220 may receive the sensing temperature information of the corresponding IGBT element from the temperature sensing unit 210. The signal processing unit 220 may convert the form of the sensing temperature information of the corresponding IGBT element into the duty pulse. A process in which the form of the sensing temperature information is converted into the duty pulse form may be confirmed through FIG. 4.

Figure 4:
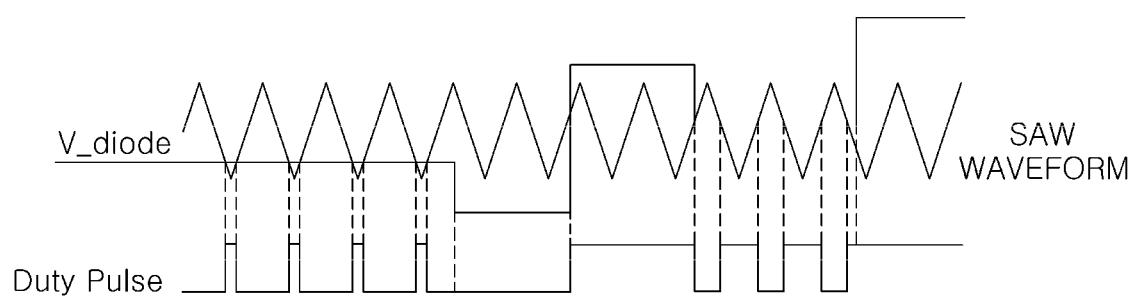
FIG. 4 is a diagram for describing a duty pulse generating method of a signal processing unit of FIG. 3.

Referring to FIG. 4, the signal processing unit 220 compares diode voltage V_diode corresponding to the temperature information of the IGBT element and an SAW waveform to generate the duty pulse Duty Pulse. To this end, the signal processing unit 220 may include a wave generating unit (not illustrated) generating the SAW waveform and a comparator (not illustrated).

Referring back to FIG. 3, the signal processing unit 220 may output the duty pulse in accordance with a rising edge of the synchronization signal.

The switch driving unit 230 may turn-on control the corresponding IGBT element by applying the voltage to the gate terminal of the corresponding IGBT element according to the control signal of the main micom 111.

A maximum duty pulse Feedback having a maximum duty among duty pulses output from the plurality of integrated circuit units may be input into the deviation acquiring unit 240. The maximum duty pulse may be generated when the plurality of duty pulses passes through an OR gate (not illustrated).

The duty pulse output from the signal processing unit 220 may be directly input into the deviation acquiring unit 240. The deviation acquiring unit 240 compares the maximum duty pulse and the duty pulse output from the signal processing unit 220 to acquire a difference value therebetween. A difference value acquiring method of the deviation acquiring unit 240 may be formed through FIG. 5.

Figure 5:
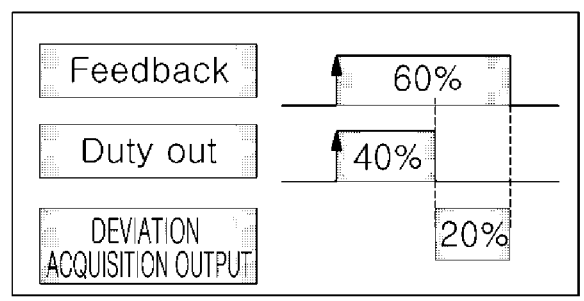
FIG. 5 is a diagram illustrating an input signal and an output signal of a deviation acquiring unit of FIG. 3.

FIG. 5 is a diagram illustrating an input signal and an output signal of a deviation acquiring unit of FIG. 3.

Referring to FIG. 5, when the maximum duty pulse Feedback has a duty of 60% and the duty pulse Duty out has a duty of 40%, the deviation acquiring unit 240 may acquire a duty difference value of 20%.

Referring back to FIG. 3, when the deviation acquiring unit 240 receives a compensation signal Compensation as an input from the main micom 111 to be enabled, the deviation acquiring unit 240 may output the acquired duty difference value.

The average calculating unit 250 may receive the duty difference value for a predetermined time and calculate an average value of the received duty difference value. Therefore, noise of the duty difference value may be removed. The average calculating unit 250 may transfer the duty difference value from which the noise is removed to the signal processing unit 220.

The signal processing unit 220 may output a corrected duty pulse by adding the duty difference value during motor driving. Therefore, the integrated circuit unit may autonomously correct and output a temperature deviation between the plurality of temperature sensing diodes. Further, the corrected duty pulses output from respective integrated circuit units may have the same duty.

Figure 6:
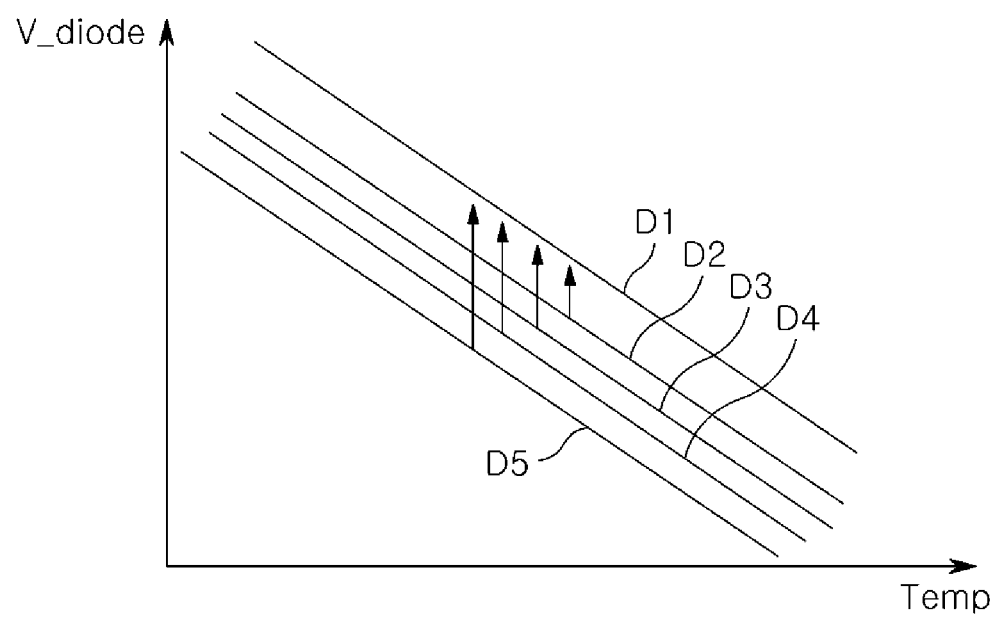
FIG. 6 is a diagram for describing a temperature characteristic deviation between temperature sensing diodes.

FIG. 6 is a diagram for describing a temperature characteristic deviation between temperature sensing diodes.

Referring to FIG. 6, a temperature characteristic deviation between temperature sensing diodes may be confirmed. In an exemplary embodiment, the first temperature sensing diode D1 may output a higher voltage value to a temperature than other temperature sensing diodes. Further, the second temperature sensing diode D2 may output a higher voltage value to the temperature than other temperature sensing diodes other than the first temperature sensing diode D1. Further, the third temperature sensing diode D3 may output a higher voltage value to the temperature than other temperature sensing diodes other than the first temperature sensing diode D1 and the second temperature sensing diode D2.

There is a deviation in sensing temperature information detected by each of the plurality of integrated circuit units according to the temperature characteristic of the temperature sensing diode.

Figure 7:
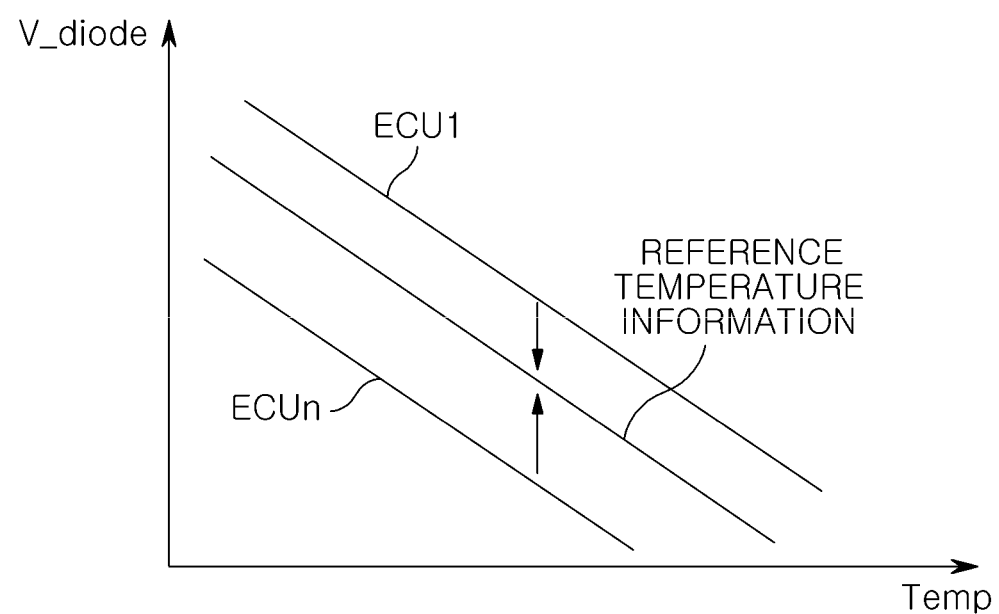
FIG. 7 is a diagram for describing a final temperature information calculating method of an ECU.

FIG. 7 is a diagram for describing a final temperature information calculating method of an ECU. Referring to FIG. 7, any one ECU (ECU1) may calculate the final temperature information by using the corrected sensing temperature information transferred from the integrated circuit unit and the reference temperature information in order to correct the temperature deviation from other controller (ECUn) (n is an integer of 2 or more).

Figure 8:
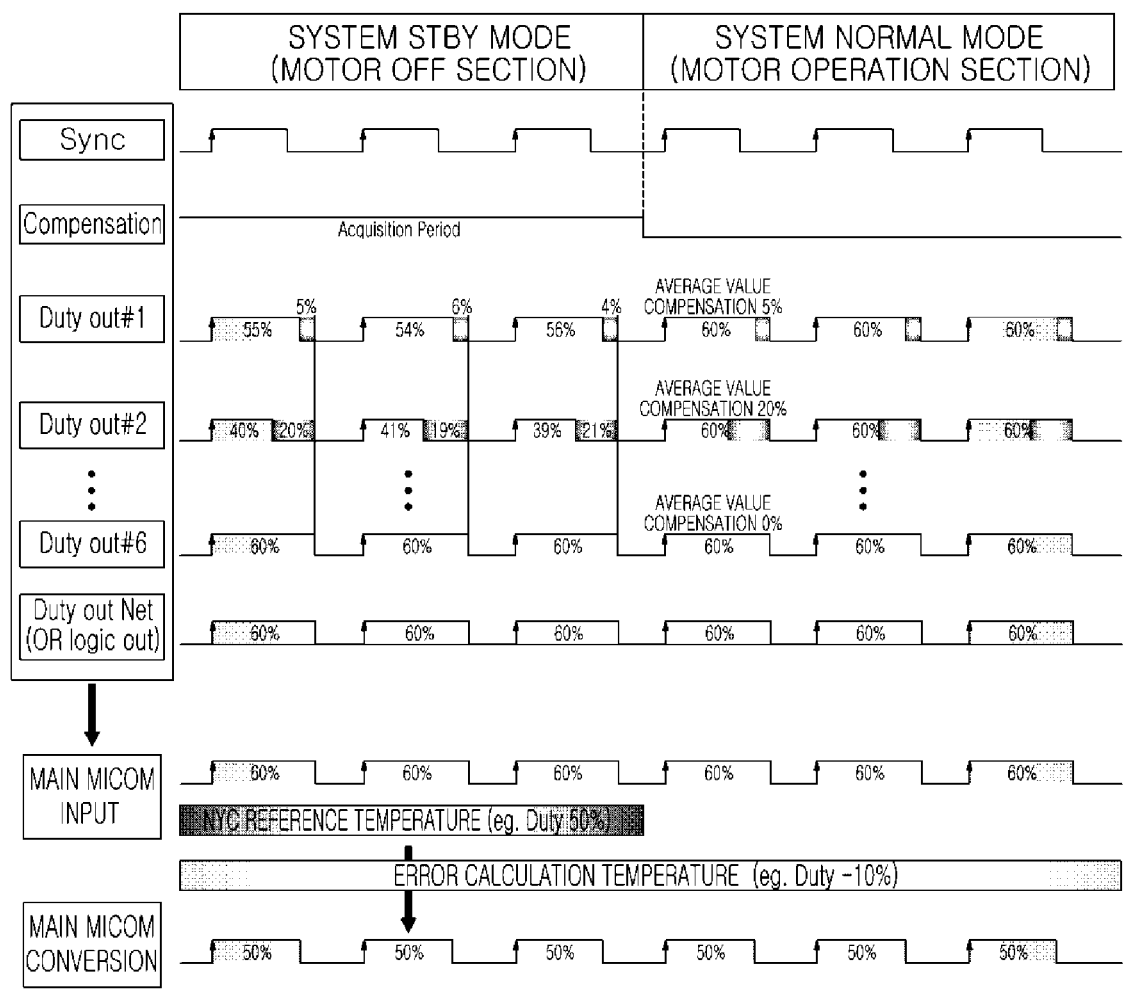
FIG. 8 is a diagram illustrating a duty pulse output from an integrated circuit unit and a duty pulse calculated by a main micom.

FIG. 8 is a diagram illustrating a duty pulse output from an integrated circuit unit and a duty pulse calculated by a main micom.

Referring to FIG. 8, various pulse waveforms in a system standby (STBY) mode depending on a motor off section and various pulse waveforms in a system normal (Normal) mode depending on a motor operation section may be confirmed.

Various pulse waveforms may include the synchronization signal (Sync), the compensation signal (Compensation), and the duty pulse. Here, the duty pulse may include a first duty pulse Duty out #1 of the first integrated circuit unit IC1 to a sixth duty pulse Duty out #6 of the sixth integrated circuit unit IC6.

In an exemplary embodiment, difference values 5%, 6%, and 4% between duty ratios 55%, 54%, and 56% of the first duty pulse Duty out #1 and a duty ratio 60% of the maximum temperature information in the motor off section may be calculated. Further, an average value 5% depending on the difference values 5%, 6%, and 4% may be calculated. In the motor operation section, the first duty pulse Duty out #1 may be corrected to have the duty ratio 60% corresponding to the maximum temperature information by adding the average value 5%.

In an exemplary embodiment, difference values 20%, 19%, and 21% between duty ratios 40%, 41%, and 39% of the second duty pulse Duty out #2 and the duty ratio 60% of the maximum temperature information in the motor off section may be calculated. Further, an average value 20% depending on the difference values 20%, 19%, and 21% may be calculated. In the motor operation section, the second duty pulse Duty out #12 may be corrected to have the duty ratio 60% corresponding to the maximum temperature information by adding the average value 20%.

Each of the duty pulses output from the plurality of integrated circuit units passes an OR logic gate to be input into the main micom 111 in a state in which each duty pulse has a maximum duty ratio.

The main micom 111 may calculate a duty pulse having a duty ratio of 50% by subtracting a duty ratio of 10% corresponding to the reference temperature information from the duty ratio of 60% of the received duty pulse. The duty pulse having the calculated duty ratio 50% may correspond to the final temperature information.

Figure 9:
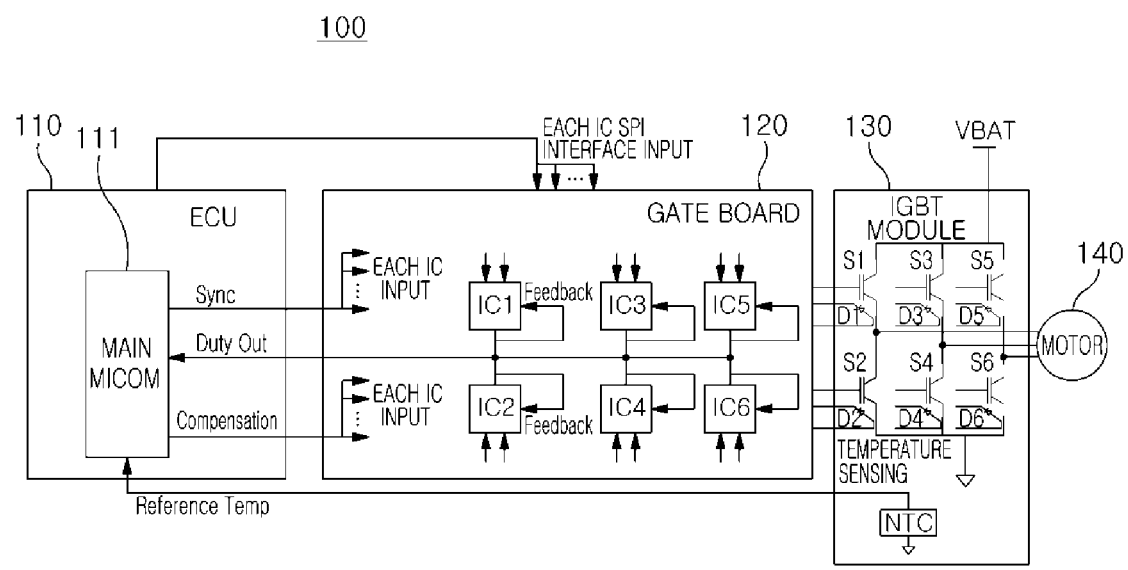
FIG. 9 is a configuration block diagram of a motor drive system with a correction function of a temperature deviation of an IGBT module in one form of the present disclosure.

FIG. 9 is a configuration block diagram of a motor drive system with a correction function of a temperature deviation of an IGBT module in some forms of the present disclosure.

Referring to FIG. 9, a motor drive system 100 with a correction function of a temperature deviation of an IGBT module in some forms of the present disclosure may additionally include a serial peripheral interface (SPI) circuit connecting the main micom 111 and the plurality of integrated circuit units as compared with the motor drive system according to FIGS. 1 to 8. Further, the SPI circuit may connect the plurality of integrated circuit units to communicate with each other.

The motor drive system 100 with a correction function of a temperature deviation of an IGBT module in some forms of the present disclosure corrects a deviation of over current (OC) detection levels of the plurality of IGBT elements.

Hereinafter, a method for correcting the deviation of the OC detection level in the integrated circuit unit will be described.

Figure 10:
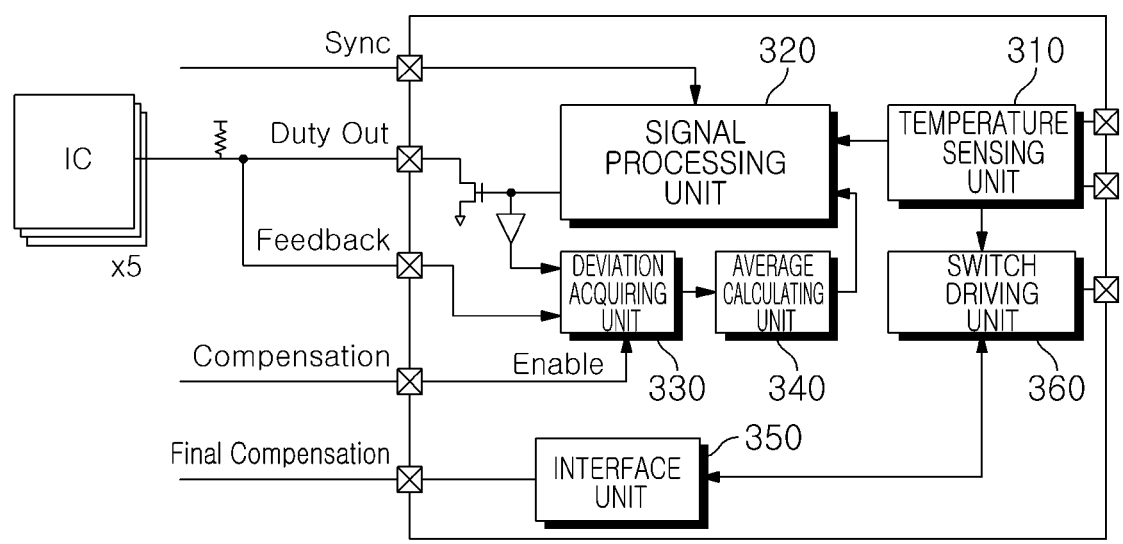
FIG. 10 is a block diagram illustrating a configuration of an integrated circuit unit of FIG. 9.

FIG. 10 is a block diagram illustrating a configuration of an integrated circuit unit of FIG. 9.

Referring to FIG. 10, the integrated circuit unit may include a temperature sensing unit 310, a signal processing unit 320, a deviation acquiring unit 330, an average calculating unit 340, an interface unit 350, and an OC sensing unit 360.

The temperature sensing unit 310, the signal processing unit 320, the deviation acquiring unit 330, and the average calculating unit 340 are components corresponding to the temperature sensing unit 210, the signal processing unit 220, the deviation acquiring unit 240, and the average calculating unit 250 described in FIGS. 1 to 8 and a detailed description thereof is replaced with the description of FIGS. 1 to 8.

The interface unit 350 may receive a final compensation signal through the SPI circuit. The interface unit 350 may transfer the final compensation signal to the OC sensing unit 360. The OC sensing unit 360 may operate according to the final compensation signal.

The OC sensing unit 360 detects the current which flows on the plurality of IGBT elements to determine whether overcurrent OC is generated. Here, the current which flows on the plurality of IGBT elements has the deviation depending on the temperature and the OC sensing unit 360 may output the OC detection level by correcting the deviation. Therefore, the plurality of integrated circuit units may transfer the same OC detection level to the main micom 111.

Figure 11:
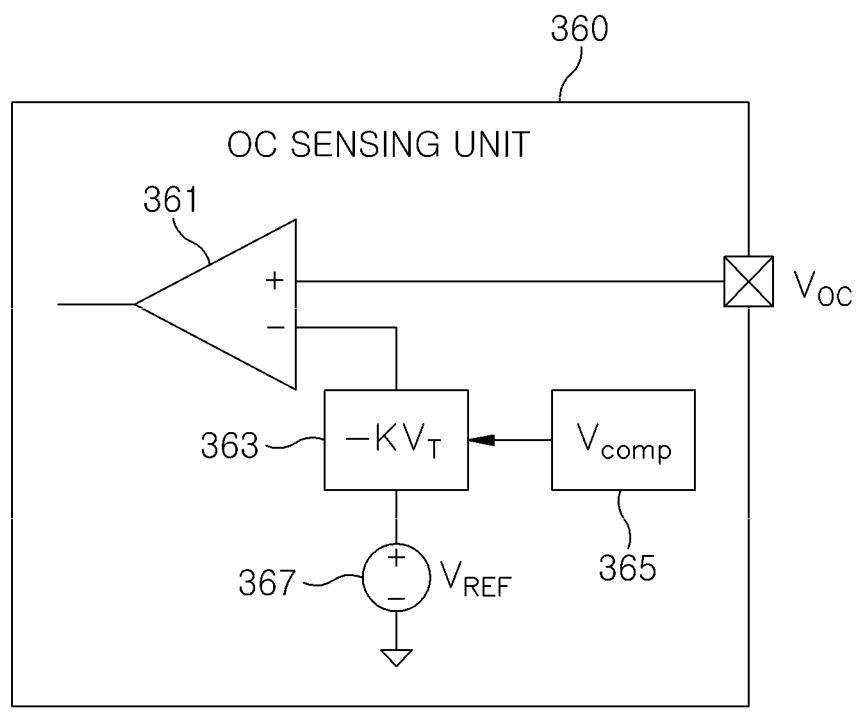
FIG. 11 is a diagram illustrating a detailed configuration of an OC sensing unit of FIG. 10.

FIG. 11 is a diagram illustrating a detailed configuration of an OC sensing unit of FIG. 10.

Referring to FIG. 11, the OC sensing unit 360 may include a comparator 360, a first subtractor 363, a second subtractor 365, and a reference power source 367.

The comparator 360 may receive voltage Voc depending on the overcurrent from the corresponding IGBT element. The comparator 360 may receive OC compensation voltage Voc_c provided by subtracting first voltage-KVT from reference voltage VREF and additionally subtracting second voltage Vcomp. The comparator 360 compares Voc and Voc_c to output a deviation compensated OC detection level.

An OC compensation voltage calculating process is represented by an equation as below.

$$Voc\_c = VREF - K^*(VT) - Vcomp, \quad \text{[Equation 1]}$$

Vcomp=correction value between integrated circuit units+NTC correction value

In Equation 1, K represents a constant, the correction value between the integrated circuit units represents voltage corresponding to the maximum temperature information, and the NTC correction value represents voltage depending on the reference temperature information.

Figure 12:
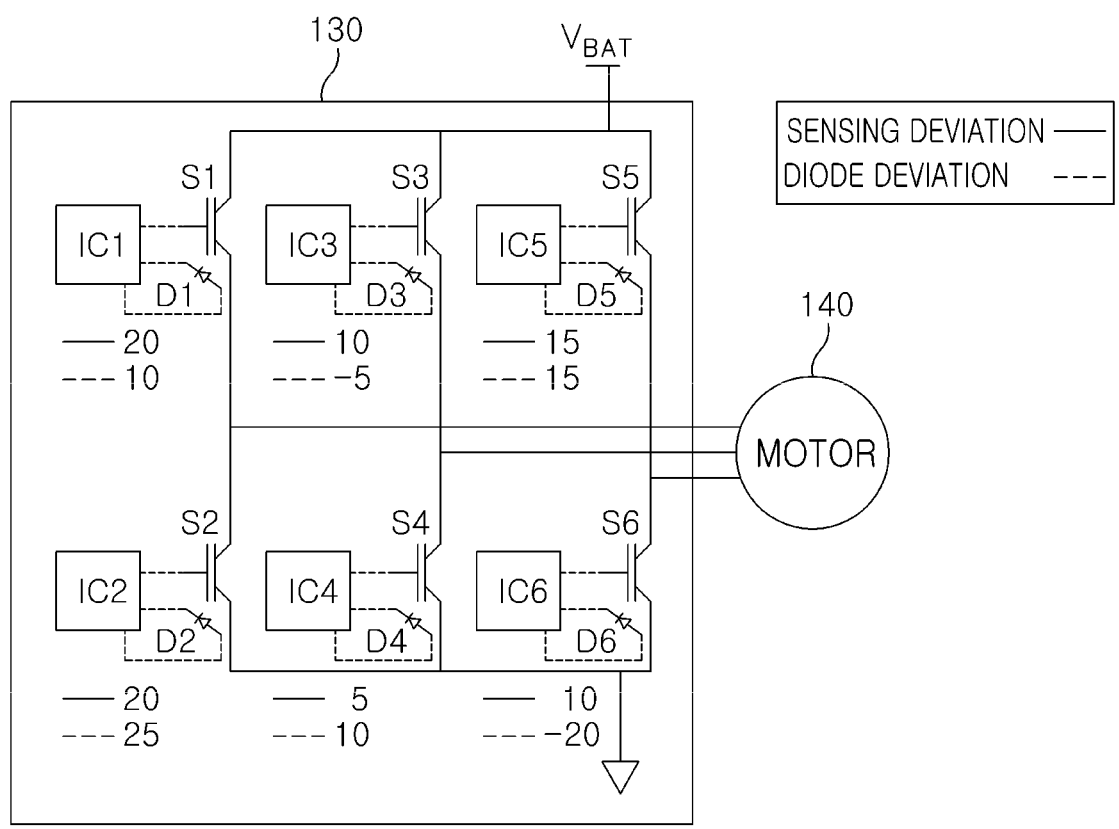
FIG. 12 is a diagram illustrating a sensing deviation of an integrated circuit unit depending on a temperature and a deviation of a temperature sensing diode as an example.

FIG. 12 is a diagram illustrating a sensing deviation of an integrated circuit unit depending on a temperature and a deviation of a temperature sensing diode as an example.

Referring to FIG. 12, a sensing deviation of the first integrated circuit unit IC1 may be represented as 20 V and the deviation of the first temperature sensing diode D1 may be represented as 10 V. In this case, the corrected OC detection level VIC1 of the first integrated circuit unit IC1 may be represented as VREFT-K (VT)+30 V (correction value between integrated circuit units)−30 V (NTC correction value).

The sensing deviation of the second integrated circuit unit IC2 may be represented as 20 V and the deviation of the second temperature sensing diode D2 may be represented as 25V. In this case, the corrected OC detection level VIC2 of the second integrated circuit unit IC2 may be represented as VREFT-K (VT)+45V (correction value between integrated circuit units)+45V (NTC correction value).

The sensing deviation of the third integrated circuit unit IC3 may be represented as 10V and the deviation of the third temperature sensing diode D3 may be represented as −5V. In this case, the corrected OC detection level VIC3 of the third integrated circuit unit IC3 may be represented as VREFT-K (VT)+5V (correction value between integrated circuit units)−5V (NTC correction value).

The sensing deviation of the fourth integrated circuit unit IC4 may be represented as 5V and the deviation of the fourth temperature sensing diode D4 may be represented as 10V. In this case, the corrected OC detection level VIC4 of the fourth integrated circuit unit IC4 may be represented as VREFT-K (VT)+15V (correction value between integrated circuit units)−15V (NTC correction value).

The sensing deviation of the fifth integrated circuit unit IC5 may be represented as 15V and the deviation of the fifth temperature sensing diode D5 may be represented as 15V. In this case, the corrected OC detection level VIC5 of the fifth integrated circuit unit IC5 may be represented as VREFT-K (VT)+30V (correction value between integrated circuit units)−30V (NTC correction value).

The sensing deviation of the sixth integrated circuit unit IC6 may be represented as 10V and the deviation of the sixth temperature sensing diode D6 may be represented as −20V. In this case, the corrected OC detection level VIC6 of the sixth integrated circuit unit IC6 may be represented as VREFT-K (VT)+10V (correction value between integrated circuit units)+10V (NTC correction value).

Therefore, the first integrated circuit unit IC1, the second integrated circuit unit IC2, the third integrated circuit unit IC3, the fourth integrated circuit unit IC4, the fifth integrated circuit unit IC5, and the sixth integrated circuit unit IC6 may have the same OC detection level.

Figure 13:
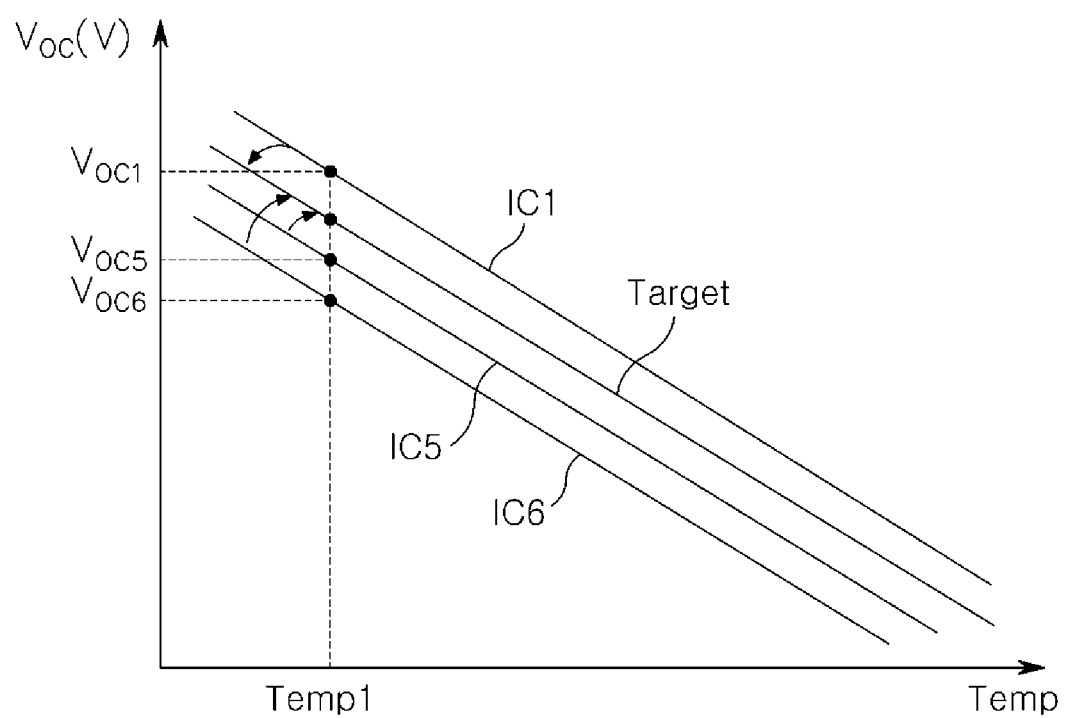
FIG. 13 is a diagram for describing correction of a sensing deviation of an integrated circuit unit.

FIG. 13 is a diagram for describing correction of a sensing deviation of an integrated circuit unit.

Figure 14:
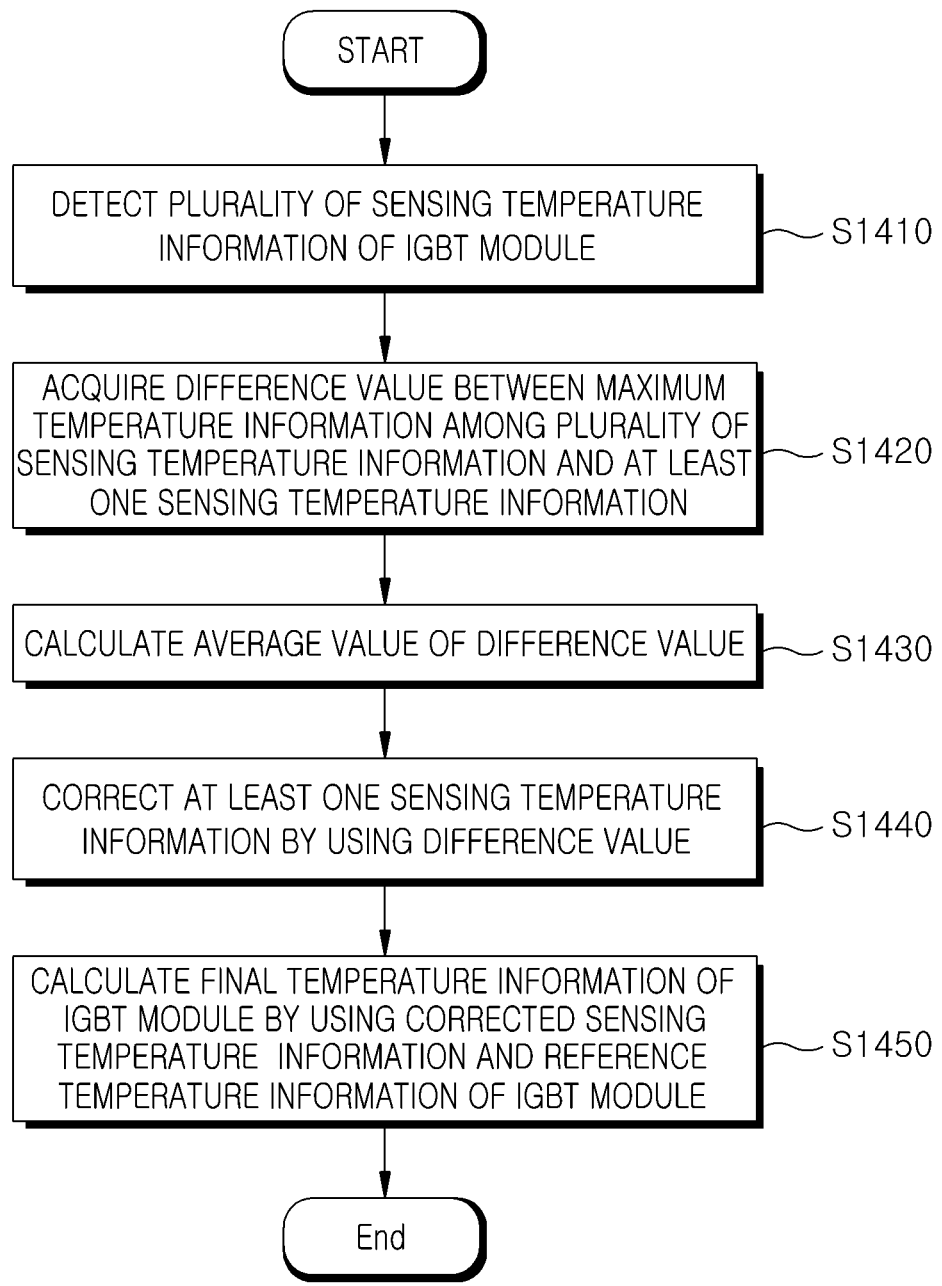
FIG. 14 is a flowchart of a method for correcting a temperature deviation of an IGBT module in one form of the present disclosure.

Referring to FIG. 13, the first integrated circuit unit IC1, the fifth integrated circuit unit IC5, and the sixth integrated circuit unit IC6 may have different OC voltages Voc1, Voc5, and Voc6 for each temperature Tempi and may have a target voltage Target through autonomous correction without an additional subblock. That is, the first integrated circuit unit IC1, the fifth integrated circuit unit IC5, and the sixth integrated circuit unit IC6 may have the same OC detection level. Therefore, there is an effect that the OC detection level is optimized to expand a maximum operation area of the motor. Further, there is an effect that fuel efficiency is enhanced through expansion of the maximum operation area of the motor. FIG. 14 is a flowchart of a method for correcting a temperature deviation of an IGBT module in some forms of the present disclosure. Referring to FIGS. 3 and 14, a method for correcting a temperature deviation of an IGBT module in some forms of the present disclosure includes a detection step (S1410) of detecting a plurality of sensing temperature information of the IGBT module 130, an acquisition step (S1420) of acquiring a difference value between the maximum temperature information among the plurality of sensing temperature information and at least one sensing temperature information, and a correction step (S1440) of correcting and outputting at least one sensing temperature information by using the difference value.

The method for correcting a temperature deviation of an IGBT module in some forms of the present disclosure may further include an average value calculating step (S1430) of calculating the average value of the difference value and a final value calculating step (S1450) of calculating the final temperature information of the IGBT module 130 by using the corrected sensing temperature information and the reference temperature information of the IGBT module 130.

In the correction step (S1440), at least one sensing temperature information may be corrected and output by using the average value calculated in the average value calculating step (S1430).

Figure 15:
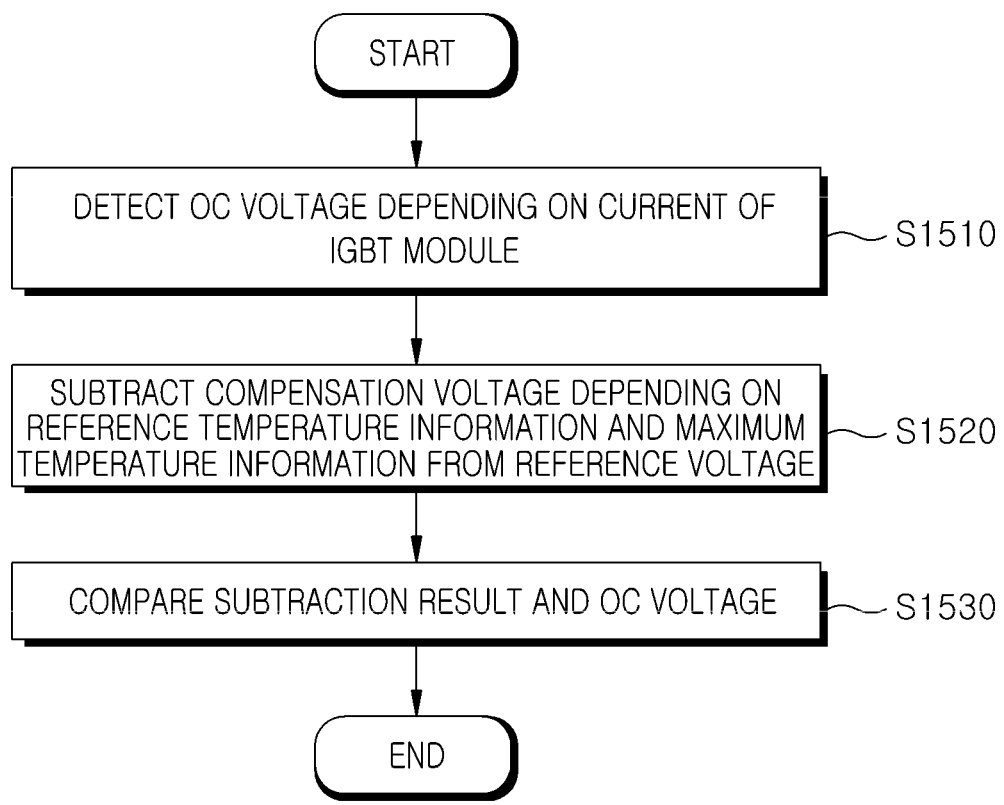
FIG. 15 is a flowchart of a method for correcting a temperature deviation of an IGBT module in one form of the present disclosure.

FIG. 15 is a flowchart of a method for correcting a temperature deviation of an IGBT module in some forms of the present disclosure.

Referring to FIGS. 10 and 15, a method for correcting a temperature deviation of an IGBT module in some forms of the present disclosure may further include a voltage detecting step (S1510) of detecting the OC voltage depending on the current of the IGBT module and a level correcting step of correcting the level of the OC voltage detected by using the reference temperature information and the maximum temperature information. Here, the level correcting step may include a subtracting step (S1520) of subtracting the compensation voltage depending on the reference temperature information and the maximum temperature information from the reference voltage and a comparing step (S1530) of comparing a subtraction result and the OC voltage.

Meanwhile, the embodiments according to the present disclosure may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the disclosure and their practical application, to thereby enable others skilled in the art to make and utilize various exemplary embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

What is claimed is:

1. A motor drive system with a correction function of a temperature deviation of an isolated-gate bipolar transistor (IGBT) module, comprising:
 a gate board configured to:
 detect a plurality of sensing temperature information by sensing the IGBT module;
 acquire a difference value between maximum temperature information among the plurality of sensing temperature information and at least one sensing temperature information; and
 correct and output the at least one sensing temperature information by using the acquired difference value; and
 a control unit configured to calculate final temperature information of the IGBT module by using the corrected at least one sensing temperature information and reference temperature information of the IGBT module.

2. The motor drive system of claim 1, wherein the IGBT module is configured to:
 acquire the reference temperature information.

3. The motor drive system of claim 1, wherein:
 the IGBT module includes a plurality of IGBT elements for motor driving,
 the gate board includes a plurality of integrated circuit units connected to the plurality of IGBT elements, respectively, and
 the plurality of integrated circuit units is configured to detect the at least one sensing temperature information from the IGBT elements, respectively.

4. The motor drive system of claim 3, wherein each of the plurality of integrated circuit units includes:
 a temperature sensing unit configured to detect the at least one sensing temperature information from a sensing diode located around each of the plurality of IGBT elements;
 a signal processing unit configured to convert the at least one sensing temperature information and output the at least one sensing temperature information as a duty pulse; and
 a deviation acquiring unit configured to calculate the difference value between the maximum temperature information and the at least one sensing temperature information corresponding to the duty pulse.

5. The motor drive system of claim 4, wherein the system further comprises:
 an average calculating unit configured to calculate an average of the calculated difference value.

6. The motor drive system of claim 4, wherein the signal processing unit is configured to:
 output the duty pulse by adding the difference value to the duty pulse corresponding to the at least one sensing temperature information.

7. The motor drive system of claim 6, wherein the each of the plurality of respective integrated circuit units is configured to output the duty pulses with the same duty ratio.

8. The motor drive system of claim 1, wherein the gate board is configured to:
 correct an OC detection level of the IGBT module by using the reference temperature information and the maximum temperature information.

9. The motor drive system of claim 8, wherein the gate board further includes:
 an OC sensing unit configured to:

subtract compensation voltage depending on the reference temperature information and the maximum temperature information from reference voltage; and compare a subtraction result and an OC voltage depending on a current of the IGBT module.

* * * * *